United States Patent [19]
Bernstein

[11] 3,712,147
[45] Jan. 23, 1973

[54] MECHANICAL DRIVE MECHANISM WITH PROGRAMMABLE OUTPUT FUNCTION

[75] Inventor: Albert Bernstein, Sepulveda, Calif.
[73] Assignee: RCA Corporation
[22] Filed: Sept. 29, 1970
[21] Appl. No.: 176,479

[52] U.S. Cl. ............74/89.22, 74/10.6, 74/89.2
[51] Int. Cl. ..................................F16h 27/02
[58] Field of Search........74/89.22, 219, 225, 242.11, 74/242.13, 242.14, 242.15, 89.21, 230.23, 242.1, 10.6, 16.29

[56] References Cited

UNITED STATES PATENTS

| 1,952,108 | 3/1934 | Wistrup | 74/10.6 |
| 1,927,851 | 9/1933 | Schurmann | 74/242.11 |
| 2,212,823 | 8/1940 | Bulk | 74/89.22 |
| 3,203,270 | 8/1965 | Booth | 74/89.22 |
| 3,273,408 | 9/1966 | Nagel et al. | 74/89.22 |

FOREIGN PATENTS OR APPLICATIONS

| 1,072,282 | 12/1959 | Germany | 74/10.6 |

Primary Examiner—Milton Kaufman
Assistant Examiner—Wesley S. Ratliff, Jr.
Attorney—Edward J. Norton

[57] ABSTRACT

A mechanical device for causing the angle of an output shaft to be a desired programmable function of an input shaft angle. The input and output shafts are coupled by a tensioned belt which traverses an intermediate idler pulley. The desired function is provided by cam control of the distance separation between the axis of the input shaft and the idler pulley.

7 Claims, 5 Drawing Figures

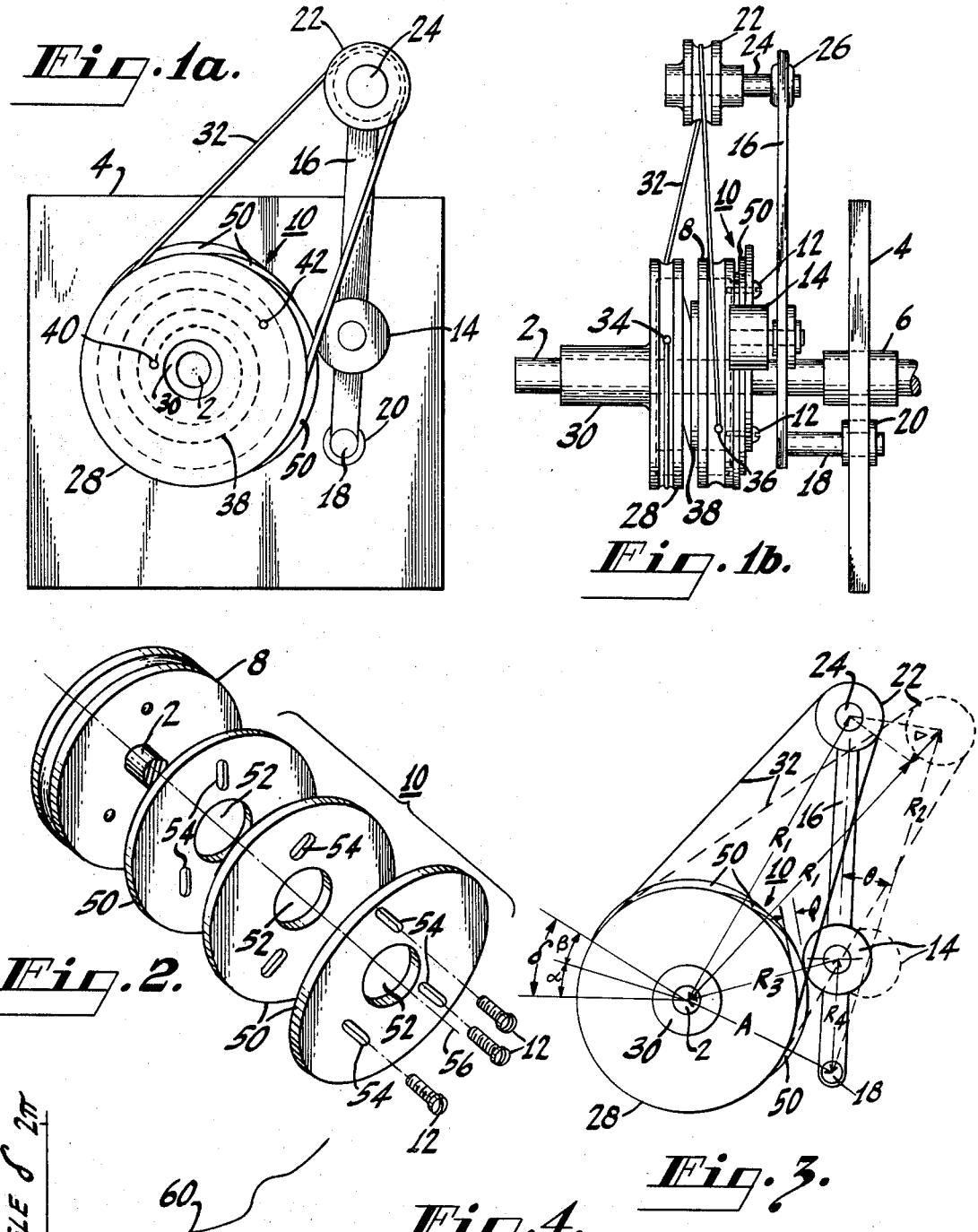

MECHANICAL DRIVE MECHANISM WITH PROGRAMMABLE OUTPUT FUNCTION

This invention relates to a mechanical device for causing an output shaft to assume an angle which is a programmable function of the input shaft angle.

The device is useful in, although not limited to, instrument dial applications such as utilized in communication receivers, and signal generators, where incremental errors are normally present at arbitrary points in the dial range. With the arrangement of the invention, mechanical corrections may be made at predetermined error points thus eliminating the need for calibration charts.

The arrangement of the invention is also useful in mechanical analog computation applications for providing linear, non-linear, or arbitrary functions.

The present inventive arrangement is simpler, and less costly than existing arrangements, which for example, find it necessary to utilize mechanical differentials, precision gearing and other more complex means. The present arrangement is inherently antibacklash, provides high mechanical magnification of the input displacement, offers at least 360° operation and is easily adjustable for a desired function.

It is therefore an object to provide an improved arrangement for providing an output shaft angle rotation which is a programmable function of the input shaft angle rotation.

Briefly according to the invention there is provided a first reel like means mounted for rotation about an axis. Cam means are mounted for rotation with the first reel like means. A second reel like means is mounted for rotation about an axis. Guide means is mounted in spaced relation with the first mentioned axis. Cam follower means are provided in cooperative relation with the cam means. The follower means is coupled in fixed spaced relation with the guide means for varying the spacing between the first mentioned axis and the guide means according to the cam means. A cord like means intercouples the first and second reel like means and the guide means. And there is provided further means coupling the first and second reel like means in a manner to provide a contra-rotational force on the reel means.

FIG. 1(a) and (b) are a plan and side view respectively of one embodiment of the invention.

FIG. 2 is an exploded view of a cam arrangement according to the invention.

FIG. 3 is a further plan view of the embodiment of FIGS. 1(a) and (b) illustrating an operating condition of the embodiment.

FIG. 4 illustrates a plot of a typical function curve obtainable according to the invention.

In FIG. 1(a) and (b) an input shaft 2 is rotatably mounted to a support member 4 by suitable means such as bushing, sleeve or bearing 6. A first pulley or reel like member 8 is fixedly mounted on the shaft 2, such as by set screws not shown, for corresponding rotation therewith. A cam member 10 is secured to one side of the member 8 by means such as screws 12. The cam surface of member 10 extends annularly about the shaft 2. Details of a preferred embodiment for the cam member 10 will be discussed hereinafter with regard to FIG. 2.

A cam follower member 14 is arranged in cooperative relation to the cam 10. The cam follower 14 is preferably rotatably mounted as shown, by suitable means such as a bushing, sleeve or bearing, to the arm or rod member 16. The arm 16 is pivotally mounted at a first end to the support member 4 by the pin or rod 18 and a suitable bushing, bearing or sleeve 20. In the vicinity of the second end of the arm 16, a pulley or drum like guide member 22 is mounted to the arm 16. It is preferable that the member 22 be rotatably mounted to the arm 16 however the guide member 22 may also be a fixed shaft or rod. As shown, for example, the guide member 22 is rotatably mounted to the support member 16 by means of a shaft 24 and a bearing, bushing or sleeve 26.

In FIG. 1a and 1b there is shown a third pulley or reel like member 28 having an output shaft 30 affixed to the member 28. The member 28 with its shaft 30 is mounted on the shaft 2, in known manner, to provide free rotation of the member 28 and shaft 30 about the shaft 2. The pulley or reel like member 8 and 28 are intercoupled by a belt or cord like means 32, which preferably does not elongate under tension. The means 32 is secured by suitable means at one end to a point 34 on the periphery of member 28 and at its other end to point 36 on the periphery of the member 8. As shown the belt or cord means 32 is at least partially wrapped about the member 28, and extends to and about the spaced pulley member 22 and then back on to the member 8. It is to be noted however that the means 32 may also be arranged to have one or more wraps about the member 8, 22 and 28.

Also coupling the members 8 and 28 is a resilient means 38. The resilient member 38 is secured to the respective members 8 and 28 in a pre-stressed manner to provide contra-rotational forces on the members 8 and 28 and thus maintain tension in the cord like means 32. In the embodiment shown in FIGS. 1(a) and (b), the resilient means 38 is a generally spiral shaped spring. The spring 38 is disposed between the members 8 and 28, and extends about the input shaft 2. One end of spring 38 is secured to member 28 by means such as a pin 42. The other end of spring 38 is secured to member 8 by means such as a pin 40.

The cam member 10 of FIG. 1 may for example be arranged as shown in FIG. 2, in which like reference numerals refer to and correspond with those shown and described with regard to FIG. 1. As shown in the exploded view of FIG. 2 the cam member 10 may be comprised of a plurality of disks 50. Any or all of the disks 50 may be circular, eliptical, irregular, or any given shape, such that when secured together the composite periphery of the disks 50, provide a desired cam surface. It will be understood however that a single disk with the desired peripheral shape may also be used. The disks 50 each have an aperture 52 for mounting about the shaft 2. The apertures 52 are made to be larger than the diameter of the shaft 2. The disks 50 also have a plurality of spaced slots or elongated apertures 54. The slots 54 facilitate mounting of the disks 50, singly or in a stacked configuration, to the member 8 by means, for example, such as screws 12. The slots 54 provide and are oriented to permit adjustment of the distance of points on the peripheral surface of a disk 50 with respect to the longitudinal axis 56 of the shaft 2.

As will be more fully understood from the subsequent discussion of the operation of the invention, this arrangement provides a simple and efficient means, for establishing or altering the desired output function, in response to a given input shaft angle.

The arrangement of FIG. 3 is the same as that shown and described with regard to FIGS. 1(a) and 1(b), although certain elements are not shown for clarity. In operation of the invention, as shown in FIG. 3, the resilient means 38 maintains tension on the belt 32 and the input and output members 8 and 28 respectively maintain a fixed angular relationship with respect to one another as long as the cam distance Q, shown in FIG. 3, is constant. For the just described condition, the output shaft angle $\delta$ is equal to the input shaft angle $\alpha$. Modification of the output angle $\delta$ of the shaft 30 such that it is a non-linear function of the input angle $\alpha$, is provided by the variation of the center to center spacing $R_1$ between the members 8 and 22 as the shaft 2 is rotated. This is accomplished in the manner shown and to be described with regard to FIG. 3, wherein the travel of the guide member 22 is shown somewhat exaggerated for purposes of clarity. When the dimension $R_1$ is incrementally changed from $R_1$ to $R_1 + \Delta$, by virtue of the input shaft 2 rotation $\alpha$ and response of the cam 10 and follower 14 which increases the distance Q, the angle of the output shaft 30 moves to $\alpha + \beta$. This occurs because the length of the belt or cord 32, tangent to the members 8 and 28, has increased and only the member 28 is free to rotate to accommodate this length change. As indicated, the modification of the distance $R_1$ to $R_1 + \Delta$ is accomplished by means of the cam 10 and follower 14, which cause the arm 16 to rotate through the angle $\theta$. The manner in which the cam assembly 10 is secured to the pulley member 8, provides translational motion a distance Q along the radial direction $R_3$, for each position of the input shaft angle $\alpha$. Since the cam assembly 10 may be made pre-adjustable, as described with regard to FIG. 2, the cam follower 14 action provides an output angle correction $\beta$ which is a function of cam height or distance Q and therefore a desired function of the input angle $\alpha$. The relationship of the correction angle $\beta$ (in radians) to cam height or distance Q is defined by the following relationships:

$$\beta = \frac{2\Delta}{F}\left[2 + \frac{(F-C)^2}{\left[\left(\frac{R_2}{R_4}\frac{Q}{\Delta}\right)(F+E+Q)\right]^2 - \Delta^2}\right]$$

$$\Delta = \left[A^2 + R_2{}^2 - \frac{S_2 A^2}{R_4} - R_2 R_4 + \frac{R_2}{R_4}\left(\frac{F}{2}+\frac{E}{2}+Q\right)^2\right]^{1/2}$$

$$(-)\left[A^2 + R_2{}^2 - \frac{R_2 A^2}{R_4} - R_2 R_4 + \frac{R_2}{R_4}\left(\frac{F}{2}+\frac{E}{2}\right)^2\right]^{1/2}$$

where;
- $F$ = Diameter of the member 8
- $E$ = Diameter of the cam follower 14
- $C$ = Diameter of the member 22
- $Q$ = Cam displacement for input shaft angle
- Dimensions $A$, $R_2$ and $R_4$ are as shown in FIG. 3.

If reference is made to FIG. 4, there is shown a plotted curve 60 of input angle $\alpha$ versus output angle $\delta$ (in radians), for a typical non-linear function which may be realized according to the invention.

For purposes of explanation the shafts 2 and 30 have been referred to as input and output shafts respectively, however it will be understood that for a particular application the shaft 30 may be considered the input shaft with shaft 2 as the output shaft.

It will also be understood that the above described arrangements are only illustrative of the invention. Other arrangements may be devised, within the spirit and scope of the invention, such as mounting the reel like means for rotation about separate axes, while however maintaining the indicated desired intercoupled relationship between the input and output members.

What is claimed is:

1. Apparatus for establishing relative angular position between at least two rotatable members, comprising:

first reel like means mounted for rotation about an axis;

cam means mounted for rotation with said first means;

second reel like means mounted for rotation about an axis;

guide means mounted in spaced relation to said first mentioned axis;

cam follower means mounted in cooperative relation with said cam means, said follower means coupled in fixed spaced relation with said guide means for varying the spacing between said first mentioned axis and said guide means according to said cam means;

cord like means intercoupling said first and second reel like means and said guide means; and further means coupling said first and second reel like means in a manner to provide a contra-rotational force on said reel means.

2. The invention according to claim 1, wherein;
   said first and second reel like means are mounted coaxially.

3. Apparatus for establishing relative angular position between at least two rotatable members, comprising:

first reel like means mounted for rotation about an axis;

second reel like means mounted for rotation about an axis;

cam means surrounding said first mentioned axis and mounted for rotation with said first reel like means;

cam follower means including guide means mounted for movement toward and away from said first mentioned axis in accordance with said cam means;

cord like means having opposite end portions secured to said first and second reel like means and an intermediate portion disposed about said guide means; and resilient means coupling said first and second reel like means in a manner to provide a contra-rotational force on said reel means.

4. Mechanical positioning apparatus, comprising:
   a rotatable shaft including a first pulley and a cam surface mounted about said shaft for rotation therewith;
   a second pulley mounted for rotatable movement about said shaft, resilient means coupling said first and second pulleys for providing a contra-rotational force between said pulleys;

an arm having a first end pivotally mounted adjacent said shaft;

a guide pulley mounted to the free end of said arm for movement toward and away from said shaft;

cam follower means secured to said arm between said ends in cooperative relation with said cam surface; and cord like means having one end secured to said first pulley and said other end secured to said second pulley, said cord like means extending at least partially about said first and second pulleys and said guide pulley, the relative angular position of said first and second pulleys being determined by the spacing between said guide pulleys and said shaft through said cord means in accordance with said cam surface.

5. The invention according to claim 4, wherein; said resilient means includes a spiral spring disposed annularly about said shaft with a first end secured to said first pulley and the opposite end secured to said second pulley.

6. The invention according to claim 5, wherein; said cam surface is comprised of a plurality of disks each having a desired shaped periphery, said disks being arranged so that at least a portion of their periphery is traversed by said cam follower means when one of said first and second pulleys is rotated.

7. The invention according to claim 6, wherein; at least one of said plurality of disks includes a slot for mounting said disk with respect to said shaft, said slot enabling lateral movement of said disk for establishing a desired spaced relation between the axis of rotation of said shaft and points on the periphery of said disk.

* * * * *